United States Patent [19]

Mukherjee

[11] Patent Number: 4,959,257
[45] Date of Patent: Sep. 25, 1990

[54] TRANSPARENCIES

[75] Inventor: Arabinda Mukherjee, Edgeware, England

[73] Assignee: Lucas Industries public limited company, Birmingham, England

[21] Appl. No.: 217,934

[22] Filed: Jul. 12, 1988

[30] Foreign Application Priority Data

Jul. 17, 1987 [GB] United Kingdom ............... 8716854

[51] Int. Cl.$^5$ .................... B32B 3/26; B32B 15/04
[52] U.S. Cl. .................... 428/156; 204/192.15; 427/109; 428/216; 428/336; 428/432; 428/434; 428/469
[58] Field of Search .................... 430/50, 57; 428/621, 428/469, 434, 432, 901, 156, 216; 427/108, 109, 110; 204/192.15; 65/60.2

[56] References Cited

U.S. PATENT DOCUMENTS

| | | | |
|---|---|---|---|
| 2,689,803 | 9/1954 | Ackerman | 427/110 |
| 3,039,896 | 6/1962 | Van Cakenberghe et al. | 428/434 |
| 3,932,025 | 1/1976 | Lakatos et al. | 430/57 |
| 3,980,476 | 9/1976 | Wysocki | 430/50 X |
| 4,336,277 | 6/1982 | Bunshah et al. | 427/38 |
| 4,421,622 | 12/1983 | Hollers | 204/192.15 |
| 4,462,883 | 7/1984 | Hart | 428/62 X |
| 4,666,078 | 5/1957 | Ohno | 427/108 |
| 4,857,094 | 8/1989 | Groth et al. | 65/60.2 |

FOREIGN PATENT DOCUMENTS

| | | | |
|---|---|---|---|
| 0239750 | 10/1987 | European Pat. Off. | 65/60.2 |
| 2417927 | 10/1974 | Fed. Rep. of Germany | 204/192.15 |
| 1419054 | 12/1975 | United Kingdom | 204/192.15 |

OTHER PUBLICATIONS

Chemical Abstracts, vol. 94, No. 8, Feb. 23, 1981, p. 287, Abstract No. 51778h, (JPA 8090444).

*Primary Examiner*—Thomas J. Herbert
*Attorney, Agent, or Firm*—Richard Bushnell

[57] ABSTRACT

A transparency such as an aircraft front window has an electrically conductive metal, e.g. gold, film vacuum deposited thereon for demisting and/or defrosting purposes. To increase the reliability of such metal film, a layer of an oxide of indium, e.g. indium tin oxide, is formed on the metal film by a sputtering operation to a typical thickness of 10 to 200 nm.

10 Claims, No Drawings

TRANSPARENCIES

This invention relates to transparencies and is more particularly concerned with transparencies of the type where an electrically conductive metal film, typically gold, is provided over a transparent substrate such as glass or a transparent resin material, e.g. acrylic or polycarbonate resin for de-misting and/or de-frosting purposes. Such electrically conductive films are commonly provided in transparencies for aircraft front windows.

In a known transparency of the above type, a substrate in the form of a self-supporting glass or plastics (e.g. acrylic) sheet which is destined to define the outboard surface of the transparency is provided with a gold film thereon by a vacuum deposition technique. A layer of cured lacquer may be provided on the inner surface of the substrate before the gold film is provided, such lacquer layer being provided to mask any imperfections in the inwardly facing surface of the substrate. The gold film is vacuum deposited onto the inboard surface of the substrate or, if present, onto the lacquer layer to a thickness of 0.6 to 1.6 nm to provide an electrically conducting layer having a resistivity of typically 25±10 ohm/square. The gold is evaporated from boats located in a vacuum chamber in such an arrangement as to provide the required variation in thickness of gold over the surface of the substrate in order to provide a film having a uniform power dissipation over the area of the transparency. Following this, a further lacquer film is provided, followed by a lacquer adhesive layer, polyvinyl butyral layers or cast layers each typically being about 0.5 mm thick, a strengthening acrylic layer typically 2 to 4 mm thick, further polyvinyl butyral or cast layers each typically being about 0.6 mm thick, a lacquer adhesive layer and a final glass sheet which is destined to form the inboard surface of the transparency.

For a typical thickness within the gold film of about 1 nm, the gold is about 60 percent porous and it is found that mechanical failure accompanied by electrical failure can occur readily. Whilst the reason for this failure is not at present fully understood, it is believed to be caused by poor adhesion of the gold film to the substrate and by fragility of the gold film, possibly due to the porous structure of such film.

An object of the present invention is to obviate or mitigate the above disadvantage.

According to the present invention, there is provided a transparency comprising a transparent substrate having an electrically conductive de-misting and/or de-icing metal film thereon, with the optional inclusion of a transparent resin layer between the substrate and the electrically conductive metal layer; and a sputtered layer containing an oxide of indium on the electrically conducting metal film.

Also according to the present invention, there is provided a method of producing a transparency comprising forming an electrically conductive metal film suitable for de-misting and/or de-icing on a transparent substrate, with the optional provision of a transparent resin layer between the substrate and the electrically conducting metal layer; and forming a layer containing an oxide of indium by a sputtering technique on the electrically conducting metal film.

The electrically conducting metal film is typically a vacuum deposited film whose thickness is varied so as to provide for uniform power dissipation over the area of the transparency. The thickness of the electrically conductive metal film is usually in the range of 0.5 to 15 nm. Within this range, the thickness chosen depends upon the type of metal employed. It is preferred to use gold as the metal and a film thickness of 0.6 to 2.5 nm, more particularly 0.6 to 1.6 nm. However, other metals may be used, for example, silver, platinum, palladium, copper/silver alloy, or copper/aluminium alloy. The completed transparency is provided with electrical contacts to enable the electrically conducting metal film to be connected with a current supply. Such contacts are typically provided initially on a glass substrate by screen printing a metallic paste along a pair of opposed edges of the substrate and then firing. The electrically conductive metal film is deposited on the substrate so as to extend between such contacts and be electrically connected therewith.

The sputtered layer containing an oxide of indium is for example an indium tin oxide (typically produced from an indium target containing up to about 50 weight percent tin), indium bismuth oxide (typically produced from an indium target containing up to 10 weight percent bismuth), indium antimony oxide (typically produced from an indium target containing up to 10 weight percent antimony), indium aluminium oxide (typically produced from an indium target containing up to 1 weight percent aluminium), or indium zinc oxide (typically produced from an indium target containing up to about 5 weight percent zinc). Normally, the sputtered layer is provided by reactively sputtering the indium and the other metal under oxidizing conditions. However, it is within the scope of the present invention to provide the layer by sputtering the oxide itself from an oxide source. Since the electrical conducting properties required of the transparency are provided by the electrically conducting metal film which lies under the sputtered layer, it is not necessary for the sputtered layer to have electrically conductive properties. Typically the sputtered layer has a thickness of 10 to 200 nm, most preferably 30 to 70 nm. Such a layer thickness may have a resistivity of about 500 ohm/square. This thickness is less than that required for conventional indium tin oxide layers to possess the necessary electrically conductive properties for de-misting and de-icing purposes. In such cases, the indium tin oxide, de-misting and de-icing layer has the thickness in the range of 200 to 600 nm. Electrically conducting indium tin oxide films produced by activated reactive evaporation and having thicknesses of from 400 to 1600 nm (resistivity - about 10–15 ohm/square) are disclosed in U.S. Pat. No. 4336277 for use in a variety of optoelectronic applications such as anti-static coatings, photoconductor storage devices, liquid crystals and electrochromic displays, photovoltaic heterojunctions and photothermal absorption devices where the film is reactively evaporated onto a transparent substrate such as glass.

The use of a reactively sputtered indium tin oxide layer over a metal layer on a transparent substrate is disclosed in GB-A-No. 2129831. Such an oxide layer is used for anti-reflection purposes and the thickness of such a layer is stated to be usually in the range of 10 to 80 nm, especially 20 to 60 nm. The metal layer in GB-A-No. 2129831is a sputtered silver having a thickness of 5 to 30 nm. Such a silver layer is provided as a low emissivity coating. In order to prevent an increase in emissivity and a reduction in light transmission which would otherwise occur upon subsequent deposition of the antireflective indium tin oxide layer by reactive sputtering, GB-A-No. 212983 discloses the sputtering of an additional layer of a metal (such as bismuth, indium, lead, manganese, iron, chromium, nickel, cobalt, molybdenum, tungsten, platinum, gold, vanadium and tantalum, and alloys thereof) onto the silver layer to a thickness of 0.5 to 10 nm, preferably 1 to 5 nm.

Such silver layer and additional metal layer will normally be provided with a uniform thickness in order to ensure uniform emissivity properties. This is in contrast to the electrically conductive metal film of the transparency of the present invention which will normally have a non-uniform thickness such as to provide for uniform power dissipation in use over the area of the transparency.

Anti-reflective metal oxide coatings such as indium tin oxide have resistivities which are very much greater than 500 ohm/square e.g. 10,000 ohm/square. The resistivity of a sputtered metal oxide coating can be varied, as is known in the art by varying the partial pressure of oxygen in the sputtering atmosphere, the composition of the cathode target etc.

The sputtered layer may define the inboard surface of the transparency. However, it is preferred to provide at least some of the additional layers described above for the known transparencies. Thus, additional lacquer, lacquer adhesive, polyvinyl butyral and acrylic resin layers may be provided over the sputtered layer of the oxide of indium, followed by a final inboard glass or transparent plastics sheet.

Examples of the present invention will now be described.

Example 1

An aircraft front window transparency is formed by vacuum depositing a film of gold onto an inboard surface of a glass sheet having a thickness of 3 mm which is destined to define the outboard surface of the transparency. The vacuum deposition is effected using a gold source provided in the boats which are arranged relative to the glass sheet in such a manner as to provide a variable thickness of gold over the sheet so that uniform power dissipation can be achieved by the resultant gold film. In this embodiment, the thickness of the layer over the surface of the sheet varies between about 0.6 and 1.6 nm, which corresponds to a resistivity range of from about 15 to 35 ohms/square.

Following this, a layer of indium tin oxide is reactively sputtered using an indium/tin target having 9:1 weight ratio of indium to tin to a depth of 50 nm directly onto the gold film. The resistivity of the sputtered indium tin oxide layer is about 500 ohm/square.

Subsequently, the following layers are provided over the indium tin oxide layer, in the order indicated by techniques which are known per se:

1. A transparent layer of lacquer (e.g. an epoxy resin produced by condensation of epichlorohydrin and bisphenol A) having a thickness of 200 micrometers.
2. A lacquer adhesive layer (e.g. polyvinyl butyral resin) having a thickness of 100 micrometers.
3. Four sheets of polyvinyl butyral, each sheet having a thickness of 0.5 mm.
4. A reinforcing acrylic layer having a thickness of 12 mm.
5. Two sheets of polyvinyl butyral, each sheet having a thickness of 0.5 mm.
6. A lacquer adhesive layer which is the same as the above mentioned lacquer adhesive layer.
7. A glass sheet having a thickness of 3 mm defining the inboard surface of the transparency.

The resultant transparency is found to be more resistant to electrical failure of the gold film than a similar transparency which was not provided with the indium tin oxide layer.

Example 2

Example 1 is repeated with the exception that, in the place of the inboard and outboard glass sheets, acrylic sheets having a thickness of 2 mm are employed with the additional provision of a thin layer of lacquer between the outboard acrylic sheet and the gold layer. Such a lacquer is formed of an epoxy resin or a butylated urea/formaldehyde resin which gives a hard, smooth, transparent surface layer results which masks any imperfections in the surface of the acrylic sheet to which it has been applied. Following this, the steps outlined in Example 1 above for vacuum deposition of the gold film and formation of the subsequent layers are followed. The above-described sample is exposed to iodine vapour at 50° C. After 250 hours exposure, there is no apparent effect. In contrast, with a transparency of the above-described type but without the indium tin oxide layer, after 45 minutes exposure to iodine vapour at 50° C., the transparency had acquired a strong blue colour over about one third of its area indicating reaction between the gold and the iodine. The blue areas had become non-conductive.

Whilst the mechanism by which the sputtered layer of indium oxide protects and strengthens the electrically conductive metal film is not fully understood, it is believed that the reactive sputtering operation secures the metal film more firmly to the substrate due to penetration of the oxide through the pores in the metal film and into the substrate below. Propagation of cracks in the metal film in the later production stages and in service due to high voltage concentrations is also prevented. The sputtered layer is believed effectively to enter the pores in the metal film and encapsulate conglomerations of metal particles without the need to provide a base layer of metal oxide under the metal film. It is also believed that the sputtering process may to some extent clean the top surface of the metal film and modify the structure of the metal in the layer. It is also believed that local peaks in the metal film are reduced by the sputtering of the indium oxide layer thereon, thereby leading to a more uniform performance of the metal film as a demister/defroster over the area of the transparency. It is observed that the resultant structure of metal film and indium oxide layer has a slightly higher electrical resistance compared with that of the metal film before sputtering of the indium oxide layer thereon. This can, of course, be taken into account when depositing the metal film.

In the place of an acrylic plastics sheet, a polycarbonate plastic sheet may be employed.

The transparency of the present invention has the advantage over a transparency where the indium tin oxide itself provides the electrically conductive layer in that it is difficult to obtain a controlled variable thickness over the area of an indium tin oxide layer in order to produce the required electrically conductive properties. The present invention avoids the requirement for this by forming the electrically conductive film for de-icing and de-misting purposes out of a metal such as gold where techniques known per se in the art can be employed for achieving the required variable thickness of the layer. The present invention avoids the need to sputter an indium tin oxide layer directly onto a layer (e.g. of plastics) which can be damaged by the conditions used for sputtering. The electrically conductive metal film upon which the oxide of indium is sputtered serves to protect the underlying layer(s) from damage. The techniques for successful deposition of a metal film such as gold onto a plastics substrate are per se known.

I claim:

1. A transparency comprising a transparent substrate having an electrically conductive de-misting and/or de-icing metal film thereon and electrical supply contacts connected to said metal film for conducting electricity therethrough, with the optional inclusion of a transparent resin layer between said substrate and said electrically conductive metal layer; and a sputtered layer containing an oxide of indium is provided on said electrically conducting metal film, wherein the thickness of said metal film varies over the surface of the transparency so that the power dissipation of said metal film is uniform over the area of the substrate.

2. The transparency according to claim 1, wherein the thickness of said metal film lies in the range of 0.5 to 15 nm.

3. The transparency according to claim 1, wherein said metal film comprises the product of vacuum deposition of said metal.

4. The transparency according to claim 1, wherein the metal of said metal film is selected from the group consisting of gold, silver, platinum, palladium, copper/silver alloy and copper/aluminium alloy.

5. The transparency according to claim 1, wherein said sputtered layer has a resistivity of about 500 ohm/square.

6. The transparency according to claim 1, wherein said sputtered layer is formed of an oxide of indium selected from the group consisting of indium tin oxide, indium bismuth oxide, indium antimony oxide, indium aluminium oxide and indium zinc oxide.

7. The transparency according to claim 1, wherein the thickness of said metal film lies in the range of 0.6 to 2.5 nm.

8. The transparency according to claim 1, wherein the metal of said film is gold, and said sputtered layer is indium tin oxide.

9. The transparency according to claim 1, wherein the sputtered layer has a thickness of 10 to 200 nm.

10. The transparency according to claim 9, wherein said sputtered layer has a thickness of 30 to 70 nm.

* * * * *